US010946852B2

(12) United States Patent
Payne et al.

(10) Patent No.: US 10,946,852 B2
(45) Date of Patent: Mar. 16, 2021

(54) SYSTEMS AND METHODS FOR DETERMINING ENGINE START TIME DURING PREDICTED ACCELERATION EVENTS (71) Applicants: Toyota Motor Engineering & Manufacturing North America, Inc., Plano, TX (US); Colorado State University Research Foundation, Fort Collins, CO (US)

(72) Inventors: Joshua Payne, Ann Arbor, MI (US); Heraldo Stefanon, Dexter, MI (US); Benjamin Geller, Ann Arbor, MI (US); Takanori Aoki, Ann Arbor, MI (US); Thomas Bradley, Fort Collins, CO (US); Zachary Asher, Kalamazoo, MI (US); David Trinko, Colorado Springs, CO (US)

(73) Assignees: Toyota Motor Engineering & Manufacturing North America, Inc., Plano, TX (US); Colorado State University Research Foundation, Fort Collins, CO (US)

( * ) Notice: Subject to any disclaimer, the term of this patent is extended or adjusted under 35 U.S.C. 154(b) by 267 days.

(21) Appl. No.: 16/143,064

(22) Filed: Sep. 26, 2018

(65) Prior Publication Data

US 2020/0094809 A1 Mar. 26, 2020

(51) Int. Cl.
*B60W 20/10* (2016.01)
*B60W 10/06* (2006.01)
(Continued)

(52) U.S. Cl.
CPC ............... *B60W 20/10* (2013.01); *B60K 6/20* (2013.01); *B60W 30/188* (2013.01); *B60W 50/0097* (2013.01); *B60W 2520/04* (2013.01); *B60W 2520/10* (2013.01); *B60W 2540/10* (2013.01); *B60W 2555/20* (2020.02);
(Continued)

(58) Field of Classification Search
CPC . G07C 5/00; G07C 5/008; G08G 1/00; G08G 1/16; B60W 20/00; B60W 20/10; B60W 30/00; B60W 30/188; B60W 50/00; B60W 50/0097; B60W 2555/20; B60W 2555/60; B60W 2520/04; B60W 2520/10; B60W 10/06; B60W 30/18; B60Y 2200/192; B60Y 2300/192; F02N 19/001; F02N 2200/10
See application file for complete search history.

(56) References Cited

U.S. PATENT DOCUMENTS 8,467,927 B2 6/2013 Thompson et al.
8,660,725 B2 2/2014 Kawai et al.
(Continued)

FOREIGN PATENT DOCUMENTS

JP 2013-154668 A 8/2013

*Primary Examiner* — Yonel Beaulieu
(74) *Attorney, Agent, or Firm* — Dinsmore & Shohl LLP (57) ABSTRACT A method may include predicting an acceleration event of a vehicle. The method may further include predicting a maximum speed of the predicted acceleration event. The method may also include determining an engine start time based on the predicted maximum speed. The method may still further include starting an engine of the vehicle at the engine start time.

20 Claims, 6 Drawing Sheets (51) Int. Cl.

| | |
|---|---|
| *B60W 50/00* | (2006.01) |
| *B60W 30/18* | (2012.01) |
| *B60K 6/20* | (2007.10) |
| *B60W 30/188* | (2012.01) |
| *F02N 19/00* | (2010.01) |

(52) U.S. Cl.
CPC ...... *B60W 2555/60* (2020.02); *B60Y 2200/92* (2013.01); *B60Y 2300/192* (2013.01); *F02N 19/001* (2013.01); *F02N 2200/10* (2013.01)

(56) References Cited

U.S. PATENT DOCUMENTS

| | | | |
|---|---|---|---|
| 9,909,516 | B2 | 3/2018 | Dufford |
| 9,932,914 | B2 | 4/2018 | Mansour et al. |
| 10,696,303 | B2* | 6/2020 | Tashiro ........... B60W 30/18072 |
| 10,717,427 | B2* | 7/2020 | Park ...................... B60W 20/30 |
| 2001/0024104 | A1* | 9/2001 | Suzuki .................. B60W 10/26 |
| | | | 320/104 |
| 2012/0179357 | A1 | 7/2012 | Phillips |
| 2016/0050315 | A1* | 2/2016 | Malhotra ............... G07C 5/008 |
| | | | 455/414.1 |
| 2018/0257624 | A1* | 9/2018 | Deberling ............... F16H 25/24 |
| 2018/0297578 | A1* | 10/2018 | Park ...................... B60K 6/485 |

\* cited by examiner

SYSTEMS AND METHODS FOR DETERMINING ENGINE START TIME DURING PREDICTED ACCELERATION EVENTS

TECHNICAL FIELD

The present application generally relates to hybrid electric vehicles and, more particularly, to determining engine start time of hybrid electric vehicles during predicted acceleration events.

BACKGROUND

A hybrid electric vehicle utilizes both battery and engine power for different purposes and in different situations. Battery power may be utilized at lower speeds, such as around town where traffic congestion and frequent stops may be encountered. By contrast, engine power may be utilized at higher speeds and where higher power needs to be maintained for longer periods/distances. Sudden accelerations may cause a transition from electric to engine power, for example. The timing of such a transition can impact the performance of the hybrid.

Accordingly, a need exists for acceleration prediction in hybrid electric vehicles.

SUMMARY

A method may comprise predicting an acceleration event of a vehicle. The method may further include predicting a maximum speed of the predicted acceleration event. The method may also include determining an engine start time based on the predicted maximum speed. The method may still further include starting an engine of the vehicle at the engine start time.

In another embodiment, a system may comprise an engine in a vehicle and a processor communicatively coupled to the engine. The processor may be configured to predict an acceleration event of a vehicle. The processor may also be configured to predict a maximum speed of the predicted acceleration event. The processor may be further configured to determine an engine start time based on the predicted maximum speed. The processor may also be further configured to start an engine of the vehicle at the engine start time.

In yet another embodiment, a vehicle may comprise an engine and a processor communicatively coupled to the engine. The processor may be configured to predict an acceleration event of a vehicle. The processor may also be configured to predict a maximum speed of the predicted acceleration event. The processor may be further configured to determine an engine start time based on the predicted maximum speed. The processor may also be further configured to start an engine of the vehicle at the engine start time.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to engine management in hybrid electric vehicles during acceleration events. More specifically, the engine may typically be started at a certain point during an acceleration event. Depending upon the predicted maximum speed of the acceleration event, the point at which the engine is started may be modified based upon a predicted maximum speed of the acceleration event, where the prediction may be based upon various criteria. Various embodiments of acceleration event-based starting of hybrid electric vehicle engines are described in detail below.

Figure 1:
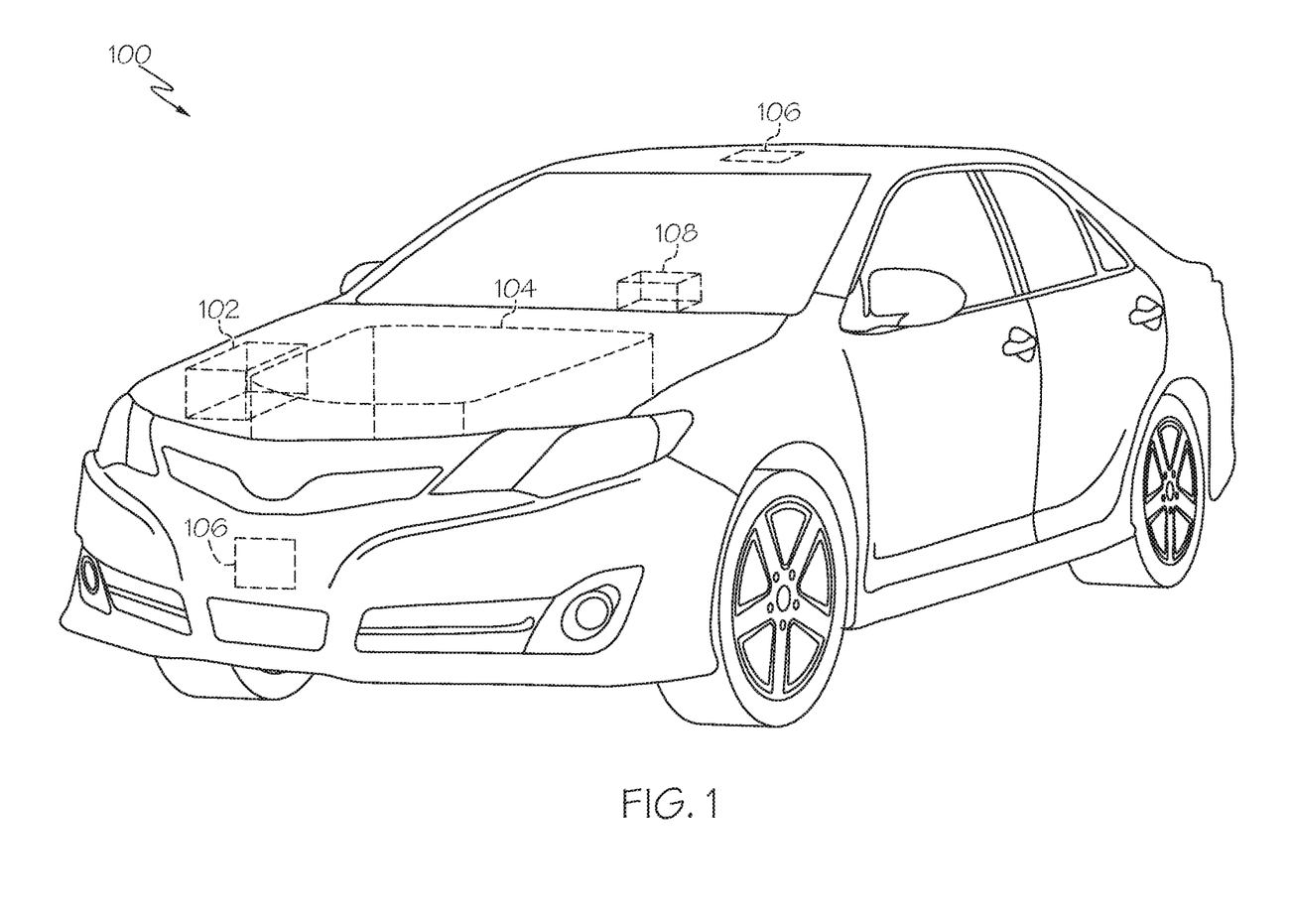
FIG. 1 is a diagram schematically illustrating an exemplary vehicle for implementing various systems and processes, according one or more embodiments shown and described herein.

Turning to FIG. 1, a vehicle 100 is depicted, which in this embodiment is a hybrid-electric vehicle ("HEV"). The vehicle 100 may include one or more batteries 102 and engines 104. In other embodiments, any type of vehicle 100 may be utilized where an engine 104 is not required for all instances of self-propulsion, such as hydraulic, fuel cell, etc. A vehicle 100 may include anything capable of transporting one or more passengers, including (but not limited to) cars, trucks, motorcycles, bicycles or any other type of passenger-powered vehicles, aircraft, spacecraft, watercraft, and submarines. A vehicle 100 may be navigated by an operator, such as a driver, pilot, captain, etc. In other embodiments, the vehicle 100 may be partially autonomous, for example where the vehicle 100 completes some tasks for a driver, such as parking or keeps the vehicle in a lane. In still other embodiments, the vehicle 100 may be autonomous, for example where the vehicle operates with no input or minimal input (such as providing destination information or route preferences) from any occupant.

In this embodiment the vehicle 100 may include one or more sensors 106, although other embodiments may not utilize any sensors 106. The vehicle 100 may utilize sensors 106 to detect temperature, motion (e.g., radar, lidar, sonar), objects (e.g., visual detection sensors including visual light, infrared, time-of-flight), and other vehicles (e.g., vehicle-to-vehicle communication). In this embodiment the vehicle 100 may also include communication equipment 108 to send and receive information. Information may include anything digital and/or analog that can be utilized to report information pertaining to the vehicle (such as speed, acceleration, location, traffic conditions, temperature, anything obtained from a sensor 106) and/or receive information pertaining the vehicle (such as operational commands/suggestions). In other embodiments communication equipment 108 may not be included.

Figure 2:
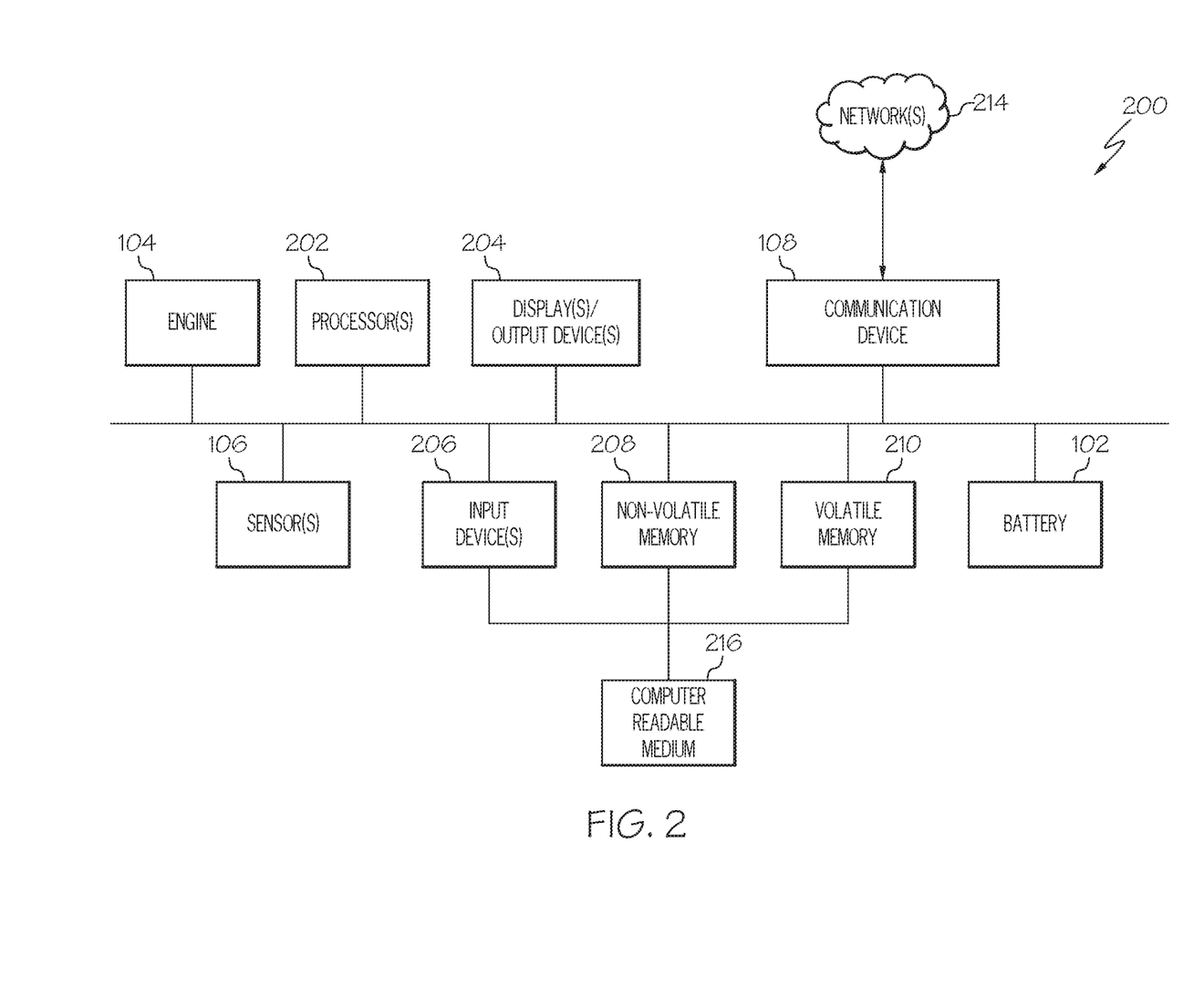
FIG. 2 is a block diagram illustrating computing hardware utilized in one or more devices for implementing various systems and processes, according one or more embodiments shown and described herein.

Turning to FIG. 2, a block diagram illustrates an exemplary computing device 200 through which embodiments of the disclosure can be implemented, such as in a vehicle control unit. The computing device 200 described herein is but one example of a suitable computing device and does not suggest any limitation on the scope of any embodiments presented. Nothing illustrated or described with respect to the computing device 200 should be interpreted as being required or as creating any type of dependency with respect to any element or plurality of elements. In various embodiments, a computing device 200 may include, but need not be limited to, a desktop, laptop, server, client, tablet, smartphone, in-robot computing devices, imaging devices, or any other type of device that can utilize data. In an embodiment, the computing device 200 includes at least one processor 202 and memory (non-volatile memory 208 and/or volatile memory 210). The computing device 200 may include non-volatile memory 208 (ROM, flash memory, etc.), volatile memory 210 (RAM, etc.), or a combination thereof. In some embodiments, the at least one processor 202 is coupled to the non-volatile memory 208 and/or volatile memory 210. The computing device 200 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 200 can include one or more displays and/or output devices 204 such as monitors, speakers, headphones, projectors, wearable-displays, holographic displays, and/or printers, for example. This may be utilized, for example, within the vehicle 100 respect to FIG. 1 in the form of a sensor 106 and/or communication equipment 108. The computing device 200 may further include one or more input devices 206 which can include, by way of example, any type of mouse, keyboard, disk/media drive, memory stick/thumb-drive, memory card, pen, touch-input device, biometric scanner, voice/auditory input device, motion-detector, camera, scale, etc. As depicted in FIG. 1, one or more sensors 106 may be in communication with various components of the computing device 200, such as to provide data relevant to the vehicle 100. The battery 102 and the engine 104 may be in communication with various components of the computing device 200, such as to provide and/or receive relevant data to and/or from the computing device 200.

A communication device 108 can facilitate communications over a network 214 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The computing device 200 may include one or more communication devices 108 to facilitate communication with one or more remote devices, which may include, for example, client and/or server devices. A communication device 108 may also be described as a communications module, as these terms may be used interchangeably. The communication device 108 can be communicatively coupled to any device capable of transmitting and/or receiving data via the network 214. Accordingly, the communication device 108 can include a communication transceiver for sending and/or receiving any wired or wireless communication. In one embodiment, the communication device 108 can be utilized for the communication equipment 108 for communication to/from the vehicle 100 as discussed herein.

For example, the communication device 108 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 216 may comprise a plurality of computer readable mediums, each of which may be either a computer readable storage medium or a computer readable signal medium. A computer readable medium 216 may reside, for example, within an input device 206, non-volatile memory 208, volatile memory 210, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media are non-transitory, and exclude propagated signals and carrier waves.

Figure 3:
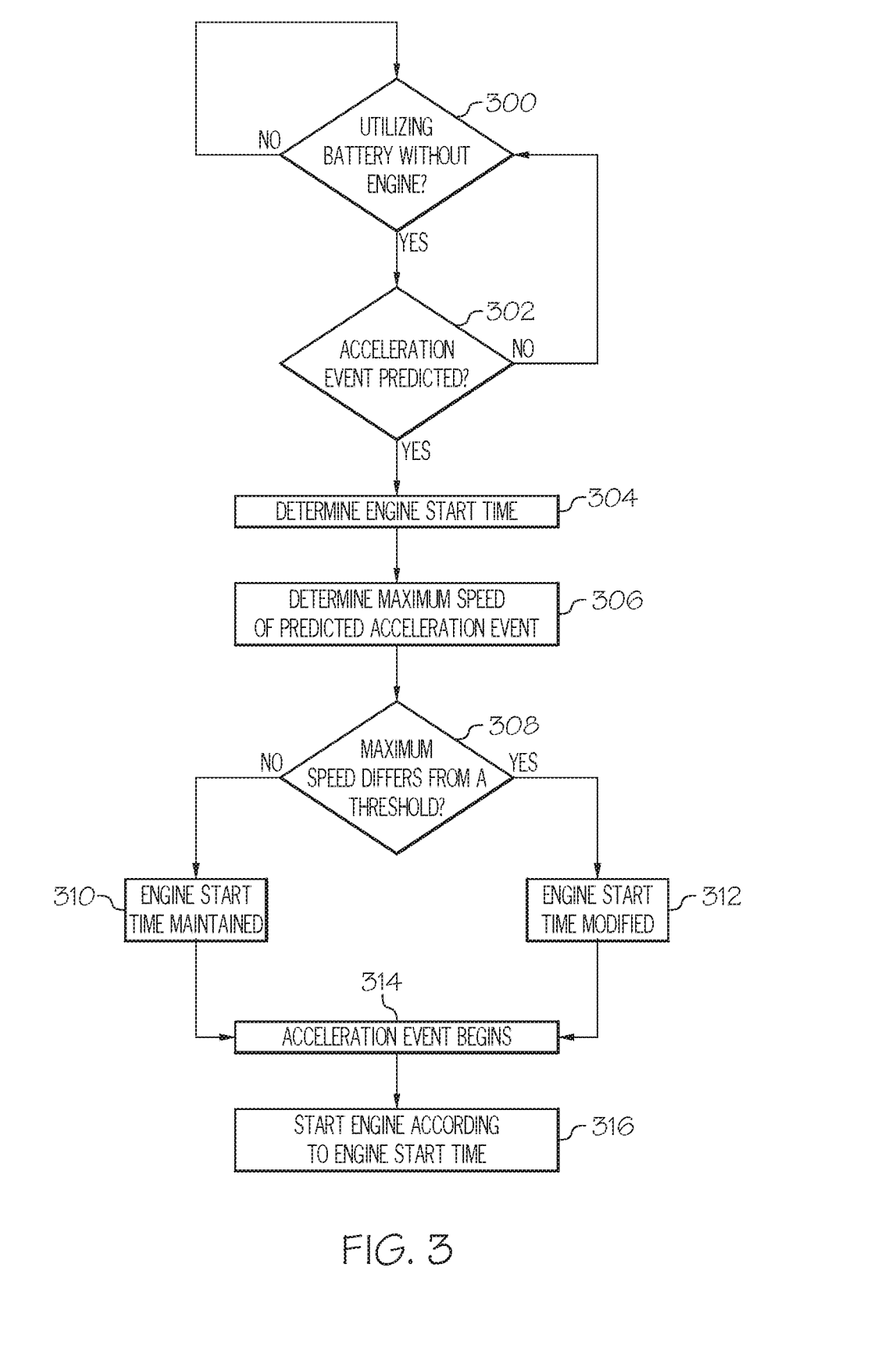
FIG. 3 illustrates a flowchart for modifying an engine start time during an acceleration event based upon a maximum speed threshold, according to one or more embodiments described and illustrated herein.

Turning to FIG. 3, a flowchart for modifying an engine start time during an acceleration event based upon a maximum speed threshold is presented. At block 300, a determination may be made as to whether a vehicle 100 is utilizing its battery for self-propulsion without its engine. If the vehicle is not, then the flowchart may return to block 300. Otherwise, if the vehicle 100 is utilizing only the battery 102 and not the engine 104 for propulsion, then at block 302, a determination may be made as to whether an acceleration event is predicted. An acceleration event prediction may utilize any suitable criteria, such as vehicle location data, stop location data, speed limit data, traffic conditions, driver history, vehicle history, and/or weather conditions. For example, if a vehicle approaches a stretch of road where other vehicles have made rapid accelerations (such as a location located after a traffic light or stop sign), acceleration data from the prior accelerations may be utilized to model future accelerations.

In some embodiments, a quantity of vehicles around the vehicle 100 is determined utilizing the vehicle's sensors 106, where a greater quantity of vehicles may decrease the likelihood of an acceleration event. Continuing with this example, traffic light data may be received via the vehicle's communication equipment 108 (e.g., having an area of many unsynchronized lights may increase the likelihood of an acceleration event). Continuing further with this example, the time of year may also be considered (e.g., winter with ice/snow may decrease the likelihood of an acceleration event). In some embodiments, an acceleration event may be based upon an amount of input force provided by a driver (e.g., the amount of force received from the driver pressing the accelerator). In another example, the engine start time may be determined with respect to when the accelerator is pressed by the driver, such that an acceleration event may be instantly determined even if an acceleration event had not been predicted to occur at that time. Acceleration event prediction is discussed in more detail below. If an acceleration event is not predicted at block 302, then the flowchart returns to block 300.

If an acceleration event is predicted at block 302, then the engine start time may be determined at block 304. In this embodiment the engine start time occurs within an acceleration event. In other embodiments the engine may not start unless at least a portion (such as an acceleration rate or maximum speed) of the acceleration event exceeds a threshold. In some embodiments, the engine start time may be measured from the start of the acceleration event. In other embodiments, the engine start time may be with reference to some other reference point. Engine start time may be determined based upon one or more suitable criteria, such as time of year, a quantity of vehicles within an area around the vehicle, and/or traffic light timing data (by way of non-limiting examples). Other factors may include vehicle location data, stop location data, speed limit data, traffic conditions, driver history, and weather conditions, and/or an amount of input force provided by a driver. In some embodiments, a neural network or other machine learning implementation may utilize such factors to determine the engine start time. Utilizing the categorizing of acceleration events as discussed in more detail below, engine start time may be predicted based upon previous acceleration events.

At block 306, the maximum speed of the predicted acceleration event may be determined. The maximum speed of the acceleration event may be predicted based upon one or more suitable criteria, for example the time of year, a quantity of vehicles within an area around the vehicle, and/or traffic light timing data. Other factors may include vehicle location data, stop location data, speed limit data, traffic conditions, driver history, and weather conditions, and/or an amount of input force provided by a driver. In some embodiments, a neural network implementation may utilize such factors to determine maximum speed of the predicted acceleration event. Utilizing the categorization of acceleration events as discussed in more detail below, the maximum speed of a predicted acceleration event may be predicted based upon previous acceleration events.

At block 308, a determination may be made as to whether the maximum speed of the predicted acceleration event differs from a maximum speed threshold. In some embodiments, the maximum speed threshold of an acceleration event may be dynamically determined by one or more of a maximum vehicle speed, vehicle temperature, and a rate of acceleration to maximum speed. Utilizing the categorization of acceleration events, as discussed in more detail below, the maximum speed of prior acceleration events may be utilized to determine a maximum speed threshold. In another example, even if the maximum vehicle speed of the predicted acceleration event is high, the maximum speed threshold may be lower due to the vehicle already having a slower rate of acceleration when having a higher temperature, could keep the maximum speed threshold lower, in which case the maximum vehicle speed could exceed the maximum speed threshold.

At block 310, if the maximum speed of the predicted acceleration event does not differ from the maximum speed threshold, then the engine start time of the predicted acceleration event may be maintained. Otherwise, if at block 308 the maximum speed of the predicted acceleration event differs from the maximum speed threshold, then at block 312 the engine start time of the predicted acceleration event may be modified. For example, the engine start time may be modified to start sooner (i.e., to occur prior to the original engine start time), but still within the acceleration event, based upon the maximum, speed of the acceleration event exceeding the maximum speed threshold. Put another way, having a predicted acceleration event with a maximum speed above the maximum speed threshold may cause the engine start time up to start sooner. By contrast, the engine start time may be modified to start later (i.e., after the engine start time), but still within the acceleration event, based upon the maximum speed of the acceleration event being below the maximum speed threshold. Put another way, having a predicted acceleration event with a maximum speed below the maximum speed threshold may move the engine start time back to start later. At block 314, the acceleration event may begin. At block 316, the engine may be started according to the engine start time, either at the original start time maintained in block 310 or at a modified engine start time obtained from block 310.

Figure 4:
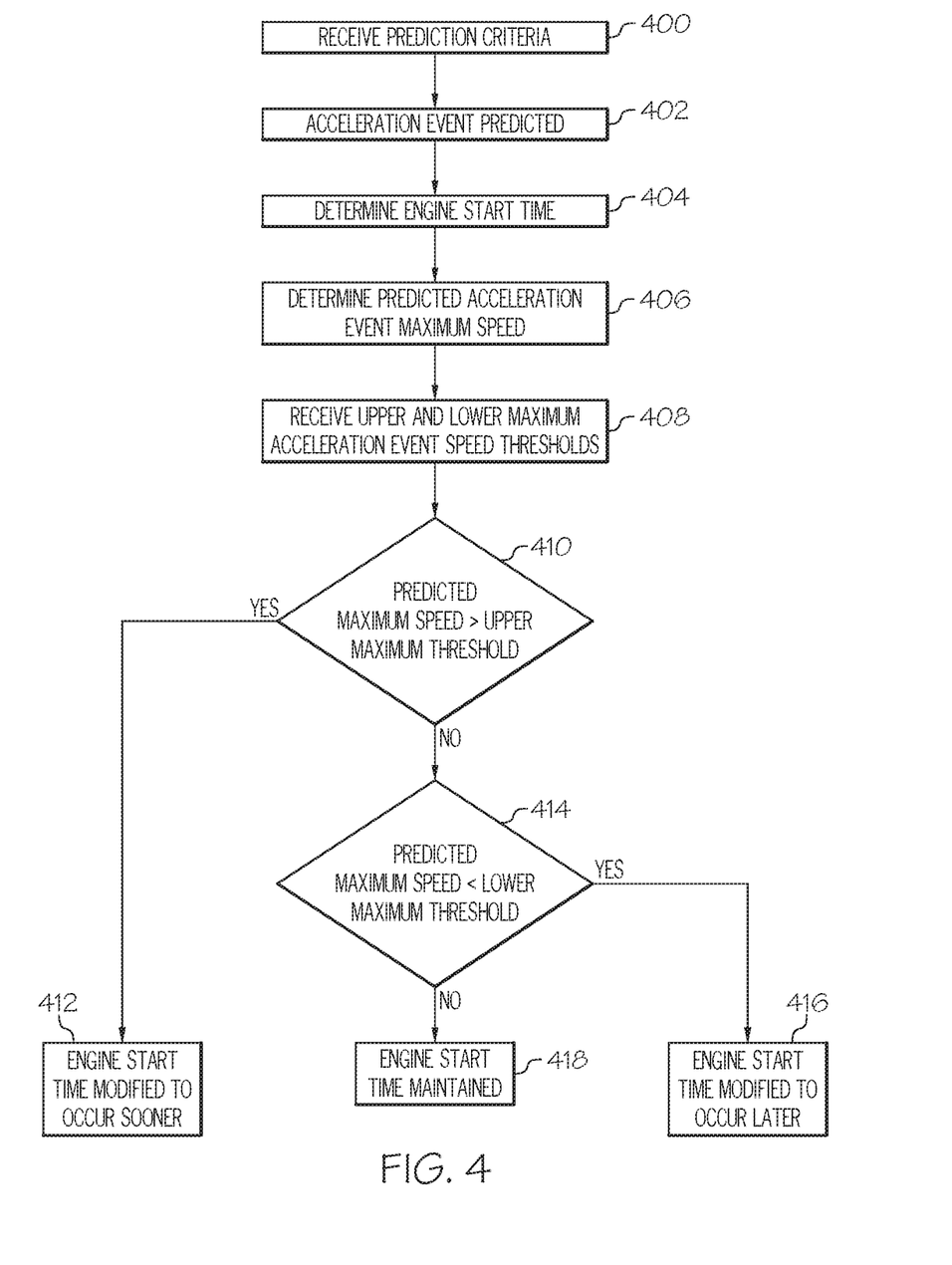
FIG. 4 illustrates a flowchart for modifying an engine start time during an acceleration event based upon a plurality of maximum speed thresholds, according to one or more embodiments described and illustrated herein.

Turning to FIG. 4, a flowchart for modifying an engine start time during an acceleration event based upon a plurality of maximum speed thresholds may be presented. At block 400, one or more prediction criteria may be received for predicting an acceleration event, an engine start time, a maximum speed of an event acceleration event, and/or a maximum speed threshold. Criteria may include any suitable information, such as vehicle location data, stop location data, speed limit data, traffic conditions, driver history, vehicle history, weather conditions, acceleration data from prior accelerations associated with a location and/or other vehicles, a quantity of vehicles around the vehicle 100, time of year, an amount of input force provided by a driver (e.g., the amount of force received from the driver pressing the accelerator), and/or traffic light timing data.

At block 402, an acceleration event may be predicted based upon, for example, any suitable criteria discussed above. Acceleration event prediction is discussed in more detail below. At block 404, an engine start time may be determined, which may be based on, for example, any suitable criteria discussed above. Utilizing the categorizing of acceleration events as discussed in more detail below, engine start time may be predicted based upon previous acceleration events. At block 406, a predicted acceleration event maximum speed may be determined based on, for example, any suitable criteria discussed above. Utilizing the categorizing of acceleration events as discussed in more detail below, the maximum speed of a predicted acceleration event may be predicted based upon previous acceleration events. At block 408, upper and lower maximum acceleration event speed thresholds may be received and/or determined based on, for example, any suitable criteria discussed above. Utilizing the categorizing of acceleration events, as discussed in more detail below, the maximum speed of prior acceleration events may be utilized to determine upper and lower maximum acceleration event speed thresholds.

At block 410, a determination may be made as to whether the predicted maximum speed exceeds the upper maximum speed threshold. If so, then at block at block 412, the engine start time may be modified to occur sooner. Otherwise if not, then at block 414 a determination may be made as to whether the predicted maximum speed is less than the upper maximum speed threshold. If so, then at block 416 the engine start time may be modified to occur later. Otherwise if the predicted maximum speed of the predicted acceleration event is between the upper and lower maximum speed thresholds, then at block 418 the engine start time may be maintained.

In some embodiments, the engine start time may be determined to be an earlier engine start time when the predicted maximum speed is a higher predicted maximum speed and the engine start time may be determined to be a later engine start time when the predicted maximum speed is a lower predicted maximum speed. The earlier engine start time may be earlier than the later engine start time and the lower predicted maximum speed may be lower than the higher predicted maximum speed.

In one embodiment, a baseline engine start time may be determined within a duration of the predicted acceleration event and the baseline engine start time may be modified to the engine start time determined based on the predicted maximum speed of the predicted acceleration event. In another embodiment, the predicted maximum speed of the predicted acceleration event may be determined based upon one or more acceleration event criteria.

Acceleration Event Dataset

Acceleration events can be extracted by identifying sections of speed data where $v_j - v_{j-1} > 0$. But, for real-world accelerations, there are moments of steady or even decreasing speed within an acceleration event and a two timestep evaluation will yield erroneous results. Additionally, the real world drive data has a high resolution and a strict equality evaluation for steady sections ($v_j - v_{j-1} = 0$) may be insufficient. To address these issues, acceleration events can be extracted by searching for sections satisfying the following logic statement where ∧ represents logical conjunction (i.e., an 'and' statement) as shown here in equation 1:

$$(v_j - v_{j-1}) \wedge (v_{j+1} - v_j) \wedge$$

$$(v_{j+2} - v_{j+1}) \wedge (v_{j+3} - v_{j+2}) \leq 0.05 \text{ mph} \quad (1)$$

If equation 1 is true, then this section of the drive cycle is labeled as an acceleration event. From these extracted acceleration events, if they either start from a negative speed, last for one second or less, or only increase speed by 5 mph or less then they can be ignored. To derive generalized improved control strategies, a dataset of acceleration events may be categorized.

Acceleration Event Categorization

Three different acceleration event categorization schemes may be provided on the basis of principle component analysis applied to a dataset, the categories being:

1) Starting velocity and ending velocity categorization; $v_i$, $v_f$
2) Time duration and ending velocity; t, $v_f$
3) Average acceleration and ending velocity;

$$\frac{vf - vt}{t}, v_f$$

The first categorization scheme utilizes starting velocity ($v_i$) and ending velocity ($v_f$). For example, category 1 here captures all acceleration events that start at 0 mph and end at 7.8±1.5 mph. The second categorization scheme utilizes time duration (t) and ending velocity ($v_f$). For example, category 1 here has a total time duration of 6.2±1.4 seconds and an ending velocity of 12.2±2.2 mph for which there are 274 acceleration events. The third categorization scheme utilizes average acceleration $$\left(\frac{vf - vt}{t}\right)$$

and ending velocity ($v_f$). For example, acceleration event category 1 may have an average acceleration of about 0.11±0.01 g's (g-force) and an ending velocity of approximately 34.2±2.2 mph.

Baseline Energy Management Strategy (EMS) Development

For a Baseline EMS, a combination of a high fidelity vehicle model was developed and used with an equation-based power-split model. The engine torque, engine speed, and engine power was then implemented in the equation-based power-split model. Fuel efficiency and battery state of charge (SOC) with respect to time were then recorded.

For a given engine power, the required electric power can be determined by subtracting the total propulsive power requirement, given by equation 2 as follows:

$$P_{elec} = F_{prop} v - P_{ICE} \quad (2)$$

where $F_{prop}$ is determined from a force balance on the vehicle is given by equation 3 as follows:

$$F_{prop} = m\dot{v} + C_{rr}mg + \tfrac{1}{2} C_d \rho_{air} v^2 A_{front} \quad (3)$$

where $C_{rr}$ is the coefficient of rolling resistance, m is the mass of the vehicle, g is the acceleration due to gravity (9.81 m/sec²), $C_d$ is the coefficient of drag, $\rho_{air}$ is the density of air (1.1985 kg/m³), v is the vehicle velocity, $A_{front}$ is the frontal area, and $\dot{v}$ is the vehicle acceleration (calculated using a numerical derivative or sensor output). Note that the additional force component due to an elevation angle is not a part of this embodiment.

The resulting battery SOC at the next timestep is then calculated as a numerical approximation by equation 4 as follows:

$$SOC_{new} = SOC - \frac{V_{oc} - \sqrt{V_{oc}^2 - 4 P_{batt} R_{int}}}{2 R_{int} Q_{batt,o}} \Delta t \quad (4)$$

where $V_{oc}$ is the open circuit voltage of 201.6 V, $R_{int}$ is the battery internal resistance of 0.373Ω, and $Q_{batt,o}$ is the battery capacity of 6.5 A·h.

The overall efficiency of the electrical components can then be captured using response surface fits of data. Using the speed and torque, the electrical system efficiency is determined and applied as $$P_{batt} = \frac{1}{\eta_{elec}} P_{elec} \quad (5)$$

where $\eta_{elec}$ is a function of electric motor speed $\omega_{EM}$, electric motor torque $T_{EM}$, generator speed $\omega_{gen}$, and generator torque $T_{gen}$. The electric motor and generator efficiency maps are used to compute, $\eta_{elec}$ as a function of the torques and speeds of the electric components.

Fuel consumption may be obtained by first deriving a Brake Specific Fuel Consumption (BSFC) map through a cubic response surface. A BSFC cubic response surface has the form given in equation 6 as follows:

$$BSFC = A_1 + A_2\omega_{ICE} + A_3 T_{ICE} + A_4 \omega_{ICE} T_{ICE} + A_5 \omega_{ICE}^2 + A_6 T_{ICE}^2 A_7 \omega_{ICE} T_{ICE}^2 + A_8 \omega_{ICE}^2 T_{ICE} + A_9 T_{ICE}^3 \quad (6)$$

where all A values are fitted constants, $\omega_{ICE}$ is the engine speed, and $T_{ICE}$ is the engine torque. Once the BSFC response surface is developed, an ideal operating line can be computed for the minimum fuel consumption for any desired power.

Lastly, the engine, generator, and wheel speed are constrained according to equations 7 and 8 as follows:

$$\omega_{ICE} = \omega_{gen} \frac{\rho}{1+\rho} + \omega_{ring} \frac{1}{1+\rho} \quad (7)$$

$$P_{batt} = \omega_{gen} T_{gen} \quad (8)$$

where $$\rho = \frac{N_{sun}}{N_{ring}},$$

$N_{teeth,generator}=30$, and $N_{teeth,ring}=78$ and is subject to operational speed limits of 13,500 rpm for the electric motor and 10,000 rpm for the generator. The ring gear speed is based on the vehicle speed as given by equation 9 as follows:

$$\omega_{ring} = \frac{r_{final\,drive} v}{R_{wheel}} \quad (9)$$

where $r_{final\,drive}$ is the final drive ratio of 3.267 and $R_{wheel}$ is the wheel radius of 0.317 m.

Optimal Energy Management Strategy Development

Deterministic dynamic programming (DP) may be used to derive the Optimal EMS. Optimal EMS is derived herein using DP for a single acceleration event in a category and applying the control matrix results to every other acceleration event in the category.

The acceleration event for which the Optimal EMS is derived is referred to as an "expected acceleration event" and may be an estimate of the most common acceleration event within the category. After the expected acceleration event is determined for each category in each acceleration event categorization scheme, the Optimal EMS can be derived using DP. DP may be utilized to find the optimal solution using backwards recursion, which avoids solutions that are not optimal. For every feasible state variable value, the optimal solution may be stored. An appropriate DP scheme may consist of a dynamic equation shown in Equation 10, a cost function shown in Equation 11, and state and control variable feasibility constraints shown in Equation 13:

$$S(k+1) = S(k) + f(S, u, w, k)\Delta t \quad (10)$$

$$J = \sum_{k=0}^{N-1} f(S, u, w, k, \Delta t) \quad (11)$$

$$S_{min}(k) \leq S(k) \leq S_{max}(k) \ (k=0,\ldots N) \quad (12)$$

$$u_{min}(k) \leq u(k) \leq u_{max}(k) \ (k=0,\ldots N-1) \quad (13)$$

where S is the state, u is the control, w is the exogenous input, k is the timestep number, $\Delta t$ is the timestep value, J is the cost, and N is the final timestep number.

For a hybrid electric vehicle Optimal EMS derivation, the state may be chosen to be the battery state of charge (SOC), the control may be chosen to be the engine power ($P_{ICE}$), the exogenous input may be the vehicle velocity (v), and the cost may be chosen to be the fuel mass consumed ($m_{fuel}$). This formulation with the added feasibility constraints of engine operation and battery SOC may be utilized to yield the following modified equations:

$$SOC(k+1) = SOC(k) + f(SOC, P_{ICE}, v, k)\Delta t \quad (14)$$

$$\text{Cost} = \sum_{k=0}^{N-1} m_{fuel} \quad (15)$$

$$SOC_{min} \leq SOC(k) \leq SOC_{max} \ (k=0,\ldots N) \quad (16)$$

$$P_{ICE,min} \leq P_{ICE}(k) \leq P_{ICE,max} \ (k=0,\ldots N-1) \quad (17)$$

This hybrid electric vehicle Optimal EMS derivation can then be tailored to a particular hybrid electric vehicle model using an equation-based power-split model, where the resulting DP formulation for the hybrid electric vehicle model may be described as:

$$SOC(k+1) = \quad (18)$$
$$SOC(k) - C_1 + C_2\sqrt{C_3 - C_4 v(k) + C_5 v(k)^3 + C_6 \dot{v}(k)v(k) - C_7 P_{ICE}}$$

$$\text{Cost} = \sum_{k=0}^{N-1} f(P_{ICE}) + W(SOC_f - SOC(N))^2 \quad (19)$$

$$40\% \leq SOC(k) \leq 80\% \ (k=0,\ldots N) \quad (20)$$

$$0 \text{ kW} \leq P_{ICE}(k) \leq 73 \text{ kW} \ (k=0,\ldots N-1) \quad (21)$$

$$C_s[f(P_{ICE})] + C_9 v(k) \leq C_{10} \quad (22)$$

where $C_1$ through $C_{10}$ are constants and W is an SOC target penalty weight set arbitrarily at 10,000. The following timestep, state, and engine power discretization values are used which were determined from a convergence test:

$$\Delta t = 0.4 \text{ sec} \tag{23}$$

$$\Delta SOC = 0.001\% \tag{24}$$

$$\Delta P_{ICE} = 0.1 \text{ kW} \tag{25}$$

A solution may be provided by utilizing an optimal control matrix which provides the minimum fuel consumption engine power for any feasible time and battery SOC during the acceleration event.

Figure 5A:
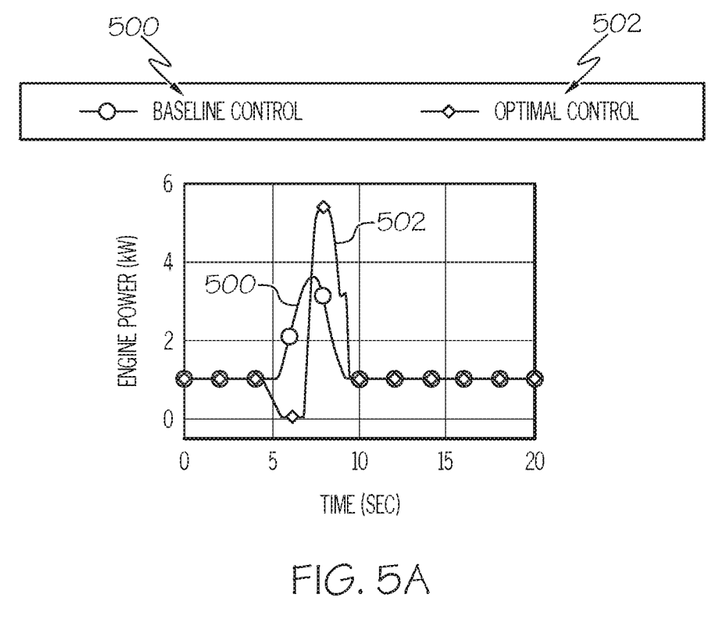
FIG. 5A illustrates a graph depicting a comparison of baseline control and optimal control results for engine power in a higher acceleration event, according to one or more embodiments shown and described herein.

Turning to FIG. 5A, a graph applies DP-derived optimal EMS to acceleration events that results in a fuel efficiency improvement. This fuel efficiency improvement may be achieved through two different engine control strategies. For a low-velocity acceleration event, FIG. 5A compares optimal control 500 (e.g., optimal EMS engine power) to baseline control 502 (e.g., baseline EMS engine power) in an example where the engine operation has been delayed due to the maximum acceleration event speed being less than a maximum speed threshold. Comparing these two control strategies reveals that the fuel efficiency improvement may be achieved using zero engine power for the first half of the acceleration event and higher engine power than the baseline EMS for the second half of the acceleration event.

Figure 5B:
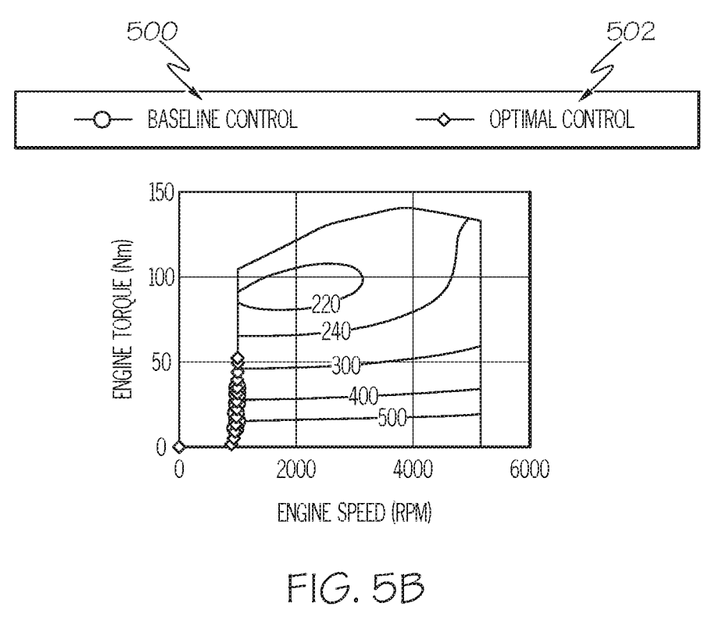
FIG. 5B illustrates a graph depicting a comparison of baseline control and optimal control results for engine operation in a higher acceleration event, according to one or more embodiments shown and described herein.

Turning to FIG. 5B, a graph compares baseline EMS and optimal EMS engine operation points. For a low-velocity acceleration event, FIG. 5B compares optimal control 500 (e.g., optimal EMS engine torque with respect to engine speed) to baseline control 502 (e.g., baseline EMS optimal engine torque with respect to engine speed). Comparing the two control strategies in FIG. 5B, this change in engine power may result in more efficient engine operation since the operation points are closer to the region of highest efficiency. In other words, there may be a delay in engine power and this control strategy can be thought of as "delayed control." Delayed control may typically result in a fuel efficiency improvement of approximately 5%. The fuel efficiency improvement is calculated according to formula 26 depicted here:

$$FE \text{ Improvement} = \frac{FE_{Optimal\ EMS} - FE_{Baseline\ EMS}}{FE_{Baseline\ EMS}} \times 100\% \tag{26}$$

Figure 6A:
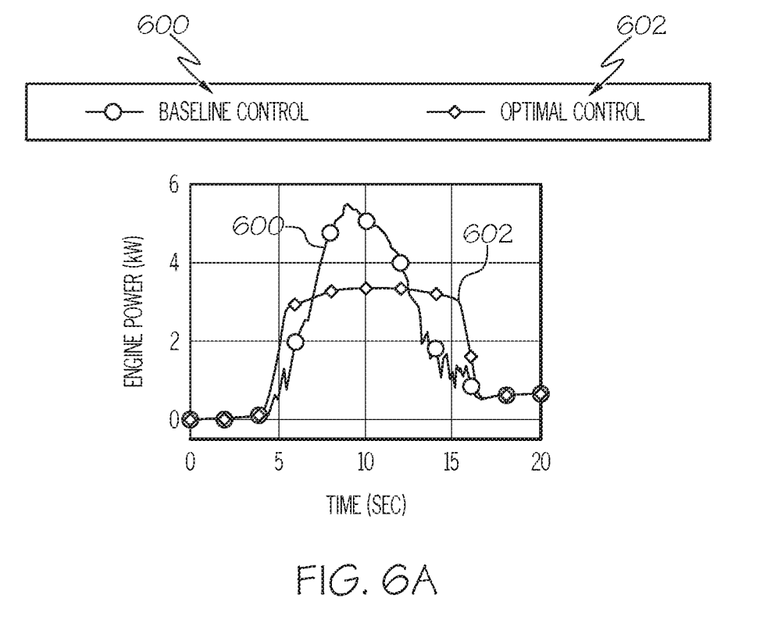
FIG. 6A illustrates a graph depicting a comparison of baseline control and optimal control results for engine power in a lower acceleration event, according to one or more embodiments described and illustrated herein.

Turning to FIG. 6A, a graph for a high velocity acceleration event compares baseline EMS and optimal EMS engine power for a high-velocity acceleration event. FIG. 6A compares optimal control 600 (e.g., optimal EMS engine power) to baseline control 602 (e.g., baseline EMS engine power) in an example where the engine operation has been advanced (i.e., starts sooner) due to the maximum acceleration event speed exceeding a maximum speed threshold. Comparing the two control strategies in FIG. 6A reveals that the fuel efficiency improvement may be achieved by using nearly constant engine power during the acceleration event.

Figure 6B:
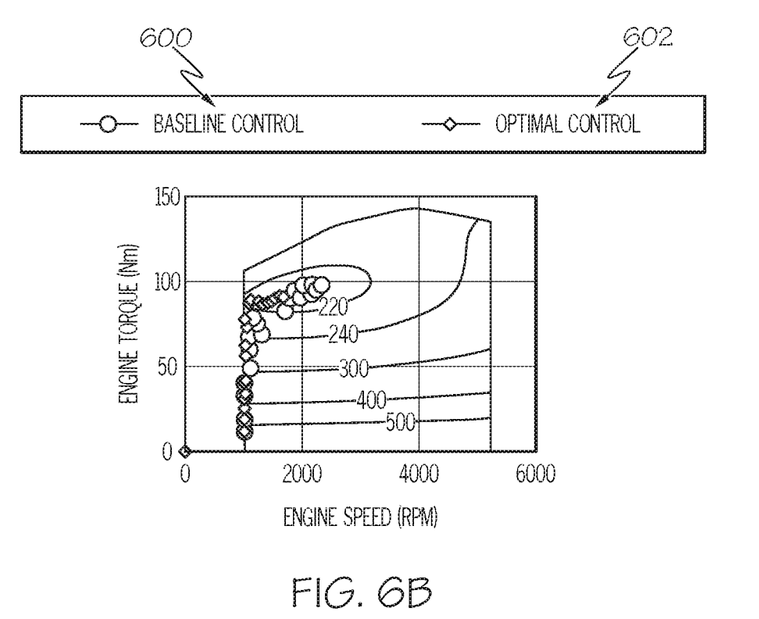
FIG. 6B illustrates a graph depicting a comparison of baseline control and optimal control results for engine operation in a lower acceleration event, according to one or more embodiments described and illustrated herein.

Turning to FIG. 6B, a graph compares the baseline EMS and optimal EMS engine operation points. For a high-velocity acceleration event, FIG. 6B compares optimal control 600 (e.g., optimal EMS engine torque with respect to engine speed) to baseline control 602 (e.g., baseline EMS optimal engine torque with respect to engine speed). Comparing the two control strategies in FIG. 6B shows that this change in engine power may result in more efficient engine operation since the engine operation points are closer to the engine operating region of highest efficiency. In other words, the engine power increase may be advanced in time and this control strategy can be thought of as "advanced control". Advanced control may typically result in a fuel efficiency improvement of approximately 2%.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

predicting an acceleration event of a vehicle;

predicting a maximum speed of the predicted acceleration event;

determining an engine start time based on the predicted maximum speed; and starting an engine of the vehicle at the engine start time.

2. The method of claim 1, wherein:

the engine start time is determined to be an earlier engine start time when the predicted maximum speed is a higher predicted maximum speed;

the engine start time is determined to be a later engine start time when the predicted maximum speed is a lower predicted maximum speed;

the earlier engine start time is earlier than the later engine start time; and the lower predicted maximum speed is lower than the higher predicted maximum speed.

3. The method of claim 1, further comprising:
determining a baseline engine start time within a duration of the predicted acceleration event; and
modifying the baseline engine start time to the engine start time determined based on the predicted maximum speed of the predicted acceleration event.

4. The method of claim 1, wherein the vehicle is a hybrid electric vehicle comprising a battery, further comprising:
utilizing the battery until the modified engine start time.

5. The method of claim 1, further comprising maintaining the engine start time when the predicted maximum speed of the acceleration event is between the higher predicted maximum speed and the lower predicted maximum speed.

6. The method of claim 1, wherein the predicted maximum speed of the predicted acceleration event is determined based upon one or more acceleration event criteria.

7. The method of claim 6, wherein the acceleration event criteria comprise vehicle location data, stop location data, speed limit data, traffic conditions, driver history, and weather conditions.

8. A system comprising:
an engine in a vehicle; and
a processor, communicatively coupled to the engine, configured to output commands to:
predict an acceleration event of a vehicle;
predict a maximum speed of the predicted acceleration event;
determine an engine start time based on the predicted maximum speed; and
start an engine of the vehicle at the engine start time.

9. The system of claim 8, wherein:
the engine start time is determined to be an earlier engine start time when the predicted maximum speed is a higher predicted maximum speed;
the engine start time is determined to be a later engine start time when the predicted maximum speed is a lower predicted maximum speed;
the earlier engine start time is earlier than the later engine start time; and
the lower predicted maximum speed is lower than the higher predicted maximum speed.

10. The system of claim 8, wherein the processor is further configured for:
determining a baseline engine start time within a duration of the predicted acceleration event; and
modifying the baseline engine start time to the engine start time determined based on the predicted maximum speed of the predicted acceleration event.

11. The system of claim 8, wherein the predicted maximum speed of the predicted acceleration event is determined based upon one or more acceleration event criteria.

12. The system of claim 8, wherein the vehicle is a hybrid electric vehicle comprising a battery, further comprising:
utilizing the battery until the modified engine start time.

13. The system of claim 8, wherein the maximum speed is dynamically determined by one or more of a maximum vehicle speed, vehicle temperature, and a rate of acceleration to maximum speed.

14. The system of claim 8, wherein the engine start time is determined based upon a neural network implementation utilizing one or more factors including time of year, a quantity of vehicles within an area around the vehicle, and traffic light timing data.

15. A vehicle comprising:
an engine; and
a processor, communicatively coupled to the engine, configured to output commands to:
predict an acceleration event of a vehicle;
predict a maximum speed of the predicted acceleration event;
determine an engine start time based on the predicted maximum speed; and
start an engine of the vehicle at the engine start time.

16. The vehicle of claim 15, wherein:
the engine start time is determined to be an earlier engine start time when the predicted maximum speed is a higher predicted maximum speed;
the engine start time is determined to be a later engine start time when the predicted maximum speed is a lower predicted maximum speed;
the earlier engine start time is earlier than the later engine start time; and
the lower predicted maximum speed is lower than the higher predicted maximum speed.

17. The vehicle of claim 15, wherein the processor is further configured for:
determining a baseline engine start time within a duration of the predicted acceleration event; and
modifying the baseline engine start time to the engine start time determined based on the predicted maximum speed of the predicted acceleration event.

18. The vehicle of claim 15, wherein the predicted maximum speed of the predicted acceleration event is determined based upon one or more acceleration event criteria.

19. The vehicle of claim 15, wherein the vehicle is a hybrid electric vehicle comprising a battery, further comprising:
utilizing the battery until the modified engine start time.

20. The vehicle of claim 15, wherein the engine start time, the predicted maximum speed of the acceleration event, or the maximum speed threshold is based upon a force amount applied to an accelerator by a driver of the vehicle.

* * * * *

UNITED STATES PATENT AND TRADEMARK OFFICE
CERTIFICATE OF CORRECTION

PATENT NO. : 10,946,852 B2
APPLICATION NO. : 16/143064
DATED : March 16, 2021
INVENTOR(S) : Joshua Payne et al.

Page 1 of 1

It is certified that error appears in the above-identified patent and that said Letters Patent is hereby corrected as shown below:

In the Specification

In Column 10, Line(s) 65, Eq. 22, delete "$C_s[f(P_{ICE})] + C_9v(k) \leq C_{10}$" and insert -- $C_8[f(P_{ICE})] + C_9v(k) \leq C_{10}$ --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*